United States Patent [19]

Bayer

[11] Patent Number: 4,889,971
[45] Date of Patent: Dec. 26, 1989

[54] APPARATUS FOR REGULATION OR LIMITATION OF TEMPERATURE

[75] Inventor: Helmut Bayer, Vienna, Austria

[73] Assignee: Electrovac Fabrikation Ellectrotechnisher Spezialartkel Gesellschaft mbH, Vienna, Austria

[21] Appl. No.: 200,278

[22] Filed: May 31, 1988

[30] Foreign Application Priority Data

Jun. 5, 1987 [AT] Austria ................. 1443/87

[51] Int. Cl.⁴ .......................... H05B 1/02; H01H 37/48
[52] U.S. Cl. .................................... 219/449; 219/512; 337/394
[58] Field of Search .................... 219/448, 449, 512; 337/382, 389, 391, 393, 394

[56] References Cited

U.S. PATENT DOCUMENTS

| | | | |
|---|---|---|---|
| 4,135,081 | 1/1979 | Fischer | 219/449 |
| 4,215,332 | 7/1980 | Wharton | 337/394 |
| 4,544,831 | 10/1985 | Bayer | 219/449 |
| 4,555,688 | 11/1985 | Bayer | 337/394 |
| 4,633,238 | 12/1986 | Goessler | 219/449 |
| 4,697,068 | 9/1987 | Schreder | 219/449 |

FOREIGN PATENT DOCUMENTS

| | | | |
|---|---|---|---|
| 383708 | 8/1987 | Austria. | |
| 2748109 | 5/1979 | Fed. Rep. of Germany | 219/449 |
| 792295 | 3/1958 | United Kingdom | 337/391 |

*Primary Examiner*—Teresa J. Walberg
*Attorney, Agent, or Firm*—Laurence R. Brown; Alfred J. Mangels

[57] ABSTRACT

A device for temperature regulation has a contact housing which is provided with a movable contact spring for breaking a circuit and on which a fastening flange is fastened. Furthermore, there is a tube of low thermal expansion, in which a bar with a high coefficient of thermal expansion is arranged so as to be longitudinally displaceable. That end of the tube located on the same side as the switch is supported in a concave receptacle arched in the direction of the contact housing.

16 Claims, 2 Drawing Sheets

FIG. 1
FIG. 2
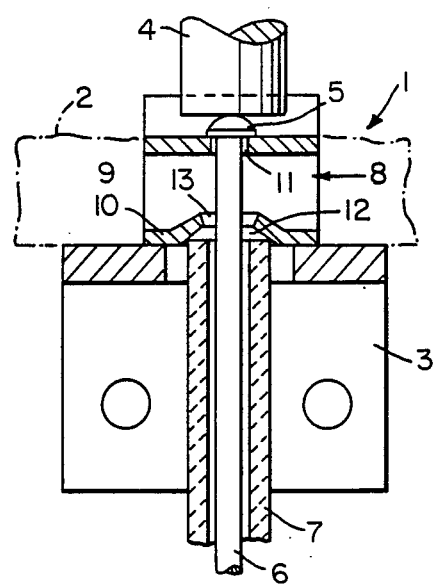
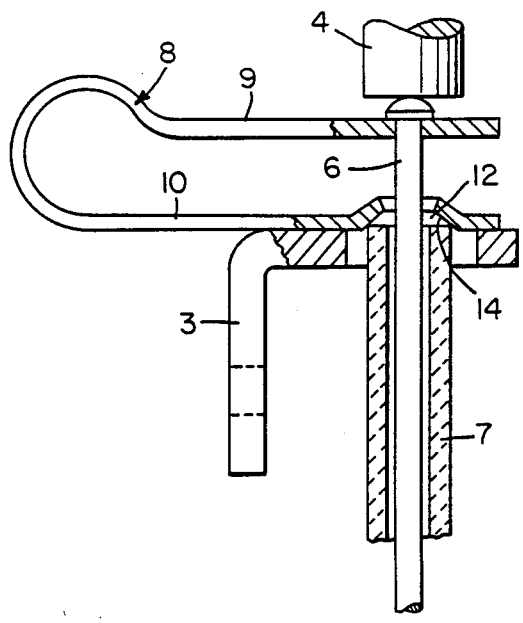
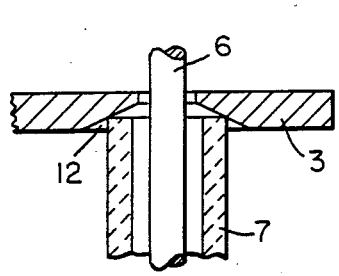
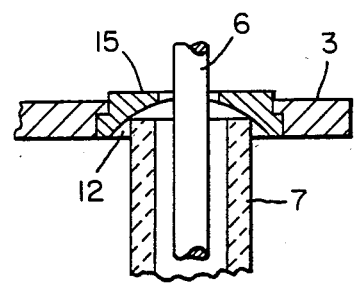
FIG. 3
FIG. 4

APPARATUS FOR REGULATION OR LIMITATION OF TEMPERATURE

BACKGROUND OF THE INVENTION

1. Field of the Invention

The invention relates to a device for regulating or limiting at least one temperature value or one temperature range of radiant-heating or contact-heating bodies of electrical cooking appliances in conjunction with hobs consisting of metal, glass ceramic or the like, in which, in order to regulate or limit the temperature of the heating body or heating bodies, between the heating body or heating bodies and the hob is arranged at least one temperature sensor having a bar of high thermal expansion, the said bar being arranged in a tube of low thermal expansion, one end of the bar being connected to a contact system serving for regulating or limiting the temperature of the heating body.

2. Description of the Related Art

In the device of the type mentioned, the temperature is regulated or limited particularly by utilizing the temperature-related axial movement of the bar-shaped temperature sensor to actuate the contact system, specifically in such a way that the heating circuit is cut in at a specific temperature and is cut out again at a specific higher temperature.

The tube surrounding the bar consists of a material resistant to high temperatures and having a low coefficient of thermal expansion and retains the bar against the axially exerted resistance of a helical spring, with the result that the tube is under axial compressive stress.

This leads to difficulties, especially during assembly, since a pivoting of the contact housing relative to the temperature sensor, that is to say the bar/tube arrangement, can occur thereby.

However, this pivoting movement often causes the tube formed from quartz glass to splinter off at the end located on the same side as the contact housing and consequently the set regulating temperature to be put out of adjustment.

Acording to U.S. Patent Specification No. 4,215,332, there is also a known device of this type, in which the quartz-glass tube is inserted into a metal mounting which rests on a dome-shaped bulge. However, if the gas tube is tilted, it can splinter off because of the tolerances between the glass tube and the metal mounting. Furthermore, lubrication has to be carried out because of the high friction values between the metal mountings and the bulge likewise formed from metal. If the friction values are too high as a result of a lack of lubrication, a breakage of the tube is often unavoidable.

SUMMARY OF THE INVENTION

An object of the present invention is to provide a device for regulating or limiting at least one temperature value or one temperature range of radiant-heating or contact-heating of the bodies described in the introduction, which, whilst preserving the original form of the tube, especially the end regions, makes it possible for the temperature sensor, that is to say the bar/tube arrangement to pivot without difficulty, above all without damage to it. There must also be the guarantee that, despite a pivoting of the temperature sensor occurring unintentionally during installation or at the works, the transmission member, that is to say the contact tappet, remains essentially at the same level, and therefore no axial movement of the transmission member and no variation in the switching temperature occur.

According to the invention, this object is achieved in that the end of the tube located on the same side as the switch is supported in a concave receptacle arched in the direction of the contact system, with a receptacle having centrally a perforation for leading through the bar.

Supporting the tube formed in most cases from quartz glass in a concave receptacle in this way makes it possible, in a particularly simple design of the tube itself, for the temperature sensor, that is to say the bar/tube arrangement, to pivot substantially without difficulty, without the tube end region in contact with the concave receptacle splintering off. At the same time, as a result of the supporting surfaces of the receptacle which are at an angle to the tube axis, no tensile forces in the direction of the tube axis, but only compressive forces which, as is known, are absorbed by glass more reasonably than tensile forces.

In a further preferred embodiment of the invention, the receptacle is arched according to the surface of the top of a body of revolution. Such a shaping of the receptacle makes it possible to obtain an especially large pivoting angle of the bar, without substantial maladjustment of the controller after installation. The body of revolution can be, for example, an ellipsoid or a paraboloid, but also a sphere.

In a development of the invention, if the body of revolution takes the form of a sphere, the procedure is such that the centre point of the sphere surface forming the receiving surface for that end of the tube located on the same side as the switch coincides with the centre point of a sphere surface closing off that end of the bar located on the same side as the contact. In this embodiment, there is the guarantee that a change in level of the transmission member or contact tappet and therefore a maladjustment of the controller does not occur independently of the pivoting angle of the bar.

However, according to another advantageous embodiment of the invention, the receptacle can also be made frustoconical. In this case it is shown that, when the bar is fitted through ±5°, there are only changes in level of the transmission member which are so slight that the temperature falsifications caused thereby are of the order of about 3° C., this being within the tolerance limit of the controller.

This can be reliably insured, especially if, according to a development of the invention, the procedure is such that, as seen in a cross-sectional plane, over the entire pivoting range 2 of the tube, at each point of contact of the tube end located on the same side as the switch with the receptacle surface, the tangential surface to the receptacle surface forms with the longitudinal axis of one bar located in the tube an angle $\alpha$ of approximately 40° to 80°, preferably approximately 65° to 75°. This also applies in the same way to cases where the arching of the receptacle has the form of any body of revolution (ellipsoid, paraboloid, etc.), and this angular condition applies to any point of contact of the pivoting range.

It has proved especially advantageous if the angle $\beta$ formed by the tangential surface and the perpendicular to the longitudinal axis of the bar is larger than the static friction angle. This guarantees that the tube end rests slidably in the receptacle and in no pivoting-angle position is there the danger that the tube edge will catch on the receptacle surface, the bar together with the tube will tilt and there will be a change in level of the transmission member and consequently a maladjustment of the controller.

A further advantageous design of the subject of the invention can involve arranging between the contact housing or fastening flange and a bearing surface at the bar and located on the same side as the switch, for example a shoulder of the bar head, a U-shaped leaf spring which is supported respectively against the contact housing or fastening flange and against the bearing surface by means of one leg. As a result of this design, an extremely small constructional height can be obtained, and the lateral movement of the bar which would cause a slight maladjustment of the controller can be relatively small. It is advantageous, at the same time, if the legs of the leaf spring are arranged perpendicularly relative to the longitudinal axis of the controller.

In a development of the invention, the receptacle itself can be formed alternatively either in the legs of the U-shaped leaf spring which come up against the contact housing or the fastening flange, in a fastening flange connected to the contact housing or in a separate bush component connected releasably to the contact housing, the first possibility having proved especially advantageous.

The invention is described in detail below with reference to several exemplary embodiments illustrated in the drawings.

BRIEF DESCRIPTION OF THE DRAWINGS

In the drawings;

FIG. 1 shows a plan view of a cross-section in the longitudinal direction of the bar, through part of a temperature-regulating device designed according to the invention, FIG. 2 shows a side view of the device according to FIG. 1, FIGS. 3 and 4 each show, enlarged, alternate embodiments according to the invention for supporting the tube.

DESCRIPTION OF THE PREFERRED EMBODIMENTS

Figure 5:
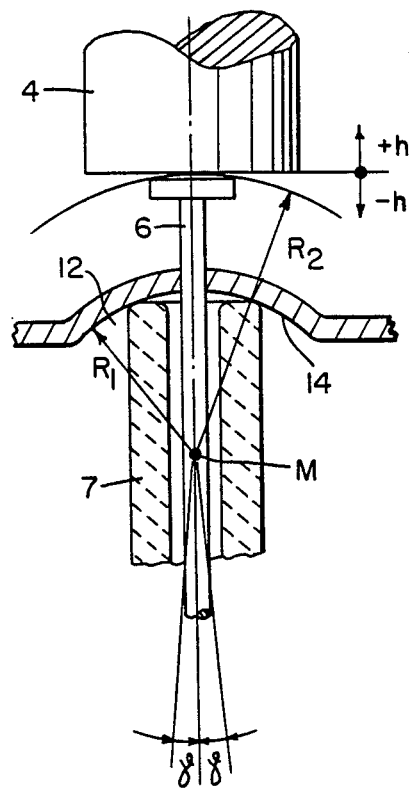
FIG. 5 shows a part view of a further embodiment of a device according to the invention, and, FIGS. 6 and 7 each show a diagrammatic representation of a tube support.

A device for temperature regulation or limitation 1, illustrated only partially in FIGS. 1 and 2, is composed of a contact housing 2, represented merely by dot-and-dash lines for the sake of simplicity, and of a fastening flange 3 connecting to the housing. The contact housing 2 with a movable contact spring for breaking the circuit corresponds to that contact housing which has already been described in detail in Austrian Patent Specification 383,708, or U.S. Pat. No. 4,555,688 of the same applicant. A cylindrical transmission member 4 guided longitudinally in the contact housing 2 and intended for moving the contact spring is provided for bearing on a shoulder-shaped head 5 of a bar 6 produced from metal. This bar 6 is surrounded for the most part by a tube 7 formed from quartz and having a low thermal expansion. As is likewise described in the abovementioned patent specifications, that end (not shown) of the tube 7 remote from the contact housing 2 is supported on a cap connected releasably to the bar end. A U-shaped leaf spring 8 with two legs 9 and 10 is arranged between the head 5 of the bar 6 and the fastening flange 3 connected to the contact housing 2. That leg 9 of the leaf spring 8 adjacent to the transmission member 4 has a perforation 11, through which the bar 6 is guided. That leg 10 of the leaf spring 8 intended for bearing on the fastening flange 3 has a concave receptacle 12 which is arched in the direction of the contact housing 2 and which has centrally a perforation 13 for receiving or guiding the bar 6. The frustoconical receptacle 12, in its region facing the tube end 7, has a surface 14 which is in contact with the tube and which, as seen in cross-section, forms with a longitudinal axis of the tube 7 or of the bar 6 an angle $\alpha$ of approximately 40° to approximately 80°, preferably 65° to 75°. Since both the bore 11 and the perforation 13 of the leaf spring 8 are made larger than the diameter of the bar 6, the latter, together with the tube 7, can be pivoted when impeded. At the same time, the edges of the tube 7 which are located in the receptacle 12 are displaced slightly along the receptacle surface or contact plane 14, and as a result of the contact plane 14 being concave in relation to the tube end, only compressive forces are transmitted to the tube 7 in the direction of the longitudinal axis of the tube, as illustrated by the vector parallelogram in FIG. 6.

The two legs 9 and 10 of the leaf spring 8 are under prestress relative to one another, so that, whilst one leg 10 is supported on the fastening flange 3, tensile forces are transmitted to the bar 6 in the direction of the transmission member 4 via the other leg 9. Because this leaf spring is designed as a flat spring with planes extending perpendicularly relative to the longitudinal direction of the bar, an especially small constructional height of the contact housing 2 can be obtained.

The invention is not restricted to forming the concave receptacle 12, arched in the direction of the contact housing, in the spring leg itself, as is the case in the embodiment illustrated in FIGS. 1 and 2. According to FIG. 3, the procedure can also be such that this receptacle 12 for the tube 7 is provided directly in the fastening flange 3. According to the further embodiment of FIG. 4, the receptacle 12 for supporting the tube 7 can be designed as a bush component 15 which, for example, is arranged releasably in the fastening flange 3.

Furthermore, the invention is not restricted to making the receptacle 12 conical. Thus, the form of the recess can also be a body of revolution, preferably a sphere, as shown especially in FIG. 5, or an ellipsoid or paraboloid.

In the embodiment according to FIG. 5, the receptacle 12 is a spherical dome, and it is essential that the center point M of the sphere surface 14 of radius $R_1$ is also the center point of that sphere of radius $R_2$, the dome of which forms the upper end of the bar head interacting with the transmission member 4. As a result of this condition, there is the guarantee that, when the bar 6 together with the tube 7 pivots through an angle $\gamma$, there is no change in the height $\pm h$ of the transmission member 4. Where an ellipsoid or paraboloid are concerned, this center point relationship applies to the secondary sphere touching the top of the ellipsoid or paraboloid at the vertex.

If the receptacle surface 14 is frustoconical according to the exemplary embodiment of FIG. 1 and the cone generatrices form an angle in the abovementioned range of 40° to approximately 80° with the longitudinal axis of the tube 7, it is guaranteed that if there is pivoting through, for example, $\gamma = \pm 5°$, the change in level $\pm h$ of the transmission member 4 is so slight that it corresponds only to temperature falsifications of approximately ±3° C., this being within the tolerance limits.

Figure 6:
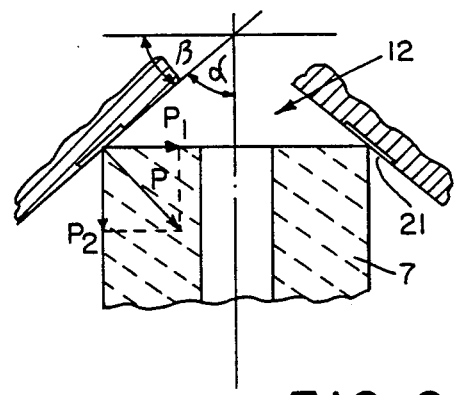

In the representation according to FIG. 6, the angle formed by the tangential plane of the receptacle 12 at the tube contact point with the perpendicular to the longitudinal axis bar is designated by $\beta$. Insofar as this angle $\beta$ is larger than the static friction angle, there is no possibility that the bar 6 together with the tube 7 will tilt.

In order to reduce the frictional forces, the tube end can be supported in the receptacle 12 by means of a disc 21 made, for example, of Teflon. This disc can be inserted into the component forming the receptacle (FIG. 6) or can be affixed to this. It is evident from the force vectors illustrated that the resultant force P takes effect in the direction of the longitudinal axis of the bar and therefore causes only compressive stress in the tube.

Figure 7:
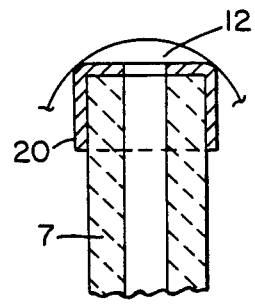

In the alternative version shown in FIG. 7, a bush 20 made of metal is arranged at that end of the tube 7 located on the same side as the switch.

I claim:

1. A device for regulating or limiting at least one temperature value or one temperature range of radiant-heating or contact-heating bodies of electrical cooking appliances in conjunction with hobs consisting of metal, glass-ceramic or the like, said device comprising: contact means for regulating the temperature of a heating body; at least one temperature sensor positioned between the heating body and a hob and having a bar of high thermal expansion material, one end of the bar being connected to the contact means; a tube of low thermal expansion material within which the bar is positioned; concave receptacle means for contacting and supporting one end of the tube located on one side of the contact means, the receptacle means having a surface arched in the direction of the contact means and having centrally a perforation for permitting the bar to pass therethrough, wherein the arched surface of the concave receptacle means is in direct contact with an end of the tube.

2. A device according to claim 1, wherein the receptacle surface is arched in accordance with a surface of the top of a body of revolution.

3. A device according to claim 2, wherein the body of revolution is a sphere, and the center point of the sphere surface defining the receptacle means surface is coincident with the center point of a sphere surface at the same end of the bar as the contact means.

4. A device according to claim 1, wherein the surface of the receptacle means is frustoconical.

5. A device according to claim 1, wherein tangents to the points at which the tube end contacts the surface of the receptacle means defines an angle of about 40° to about 80° with the longitudinal axis of the bar.

6. A device according to claim 5, wherein the tangents to the points of contact of the tube end with the surface of the receptacle means define a surface that forms a second angle relative to a perpendicular to the longitudinal axis of the bar, and wherein the second angle is larger than the static friction angle between the tube and the surface of the receptacle means.

7. A device according to claim 5, wherein the angle is from about 65° to about 75°.

8. A device according to claim 1, including U-shaped spring means positioned between the contact means and the receptacle means.

9. A device according to claim 8, wherein the spring means is a leaf spring having a pair of spaced legs, and wherein the legs are positioned substantially perpendicularly relative to the longitudinal axis of the bar.

10. A device according to claim 9, wherein the receptacle means is formed in one leg of the spring means.

11. A device according to claim 1, wherein the device includes a contact housing and the receptacle means is connected to the contact housing.

12. A device according to claim 1, wherein the receptacle means is defined in a removable bush means.

13. A device for regulating or limiting at least one temperature value or one temperature range of radiant-heating or contact-heating bodies of electrical cooking appliances in conjunction with hobs consisting of metal, glass-ceramic or the like, said device comprising: contact means for regulating the temperature of a heating body; at least one temperature sensor positioned between the heating body and a hob and having a bar of high thermal expansion material, one end of the bar being connected to the contact means; a tube of low thermal expansion material within which the bar is positioned; concave receptacle means for contacting and supporting one end of the tube located on one side of the contact means, the receptacle means having a surface arched in the direction of the contact means and having centrally a perforation for permitting the bar to pass therethrough, wherein tangents to the points at which the tube end contacts the surface of the receptacle means defines an angle of about 40° to about 80° with the longitudinal axis of the bar.

14. A device according to claim 13, wherein the tangents to the points of contact of the tube end with the surface of the receptacle means define a surface that forms a second angle relative to a perpendicular to the longitudinal axis of the bar, and wherein the second angle is larger than the static friction angle between the tube and the surface of the receptacle means.

15. A device according to claim 13, wherein the angle is from about 65° to about 75°.

16. A device for regulating or limiting at least one temperature value or one temperature range of radiant-heating or contact-heating bodies of electrical cooking appliances in conjunction with hobs consisting of metal, glass-ceramic or the like, said device comprising: contact means for regulating the temperature of a heating body; at least one temperature sensor positioned between the heating body and a hob and having a bar of high thermal expansion material, one end of the bar being connected to the contact means; a tube of low thermal expansion material within which the bar is positioned; concave receptacle means for contacting and supporting one end of the tube located on one side of the contact means, the receptacle means having a surface arched in the direction of the contact means and having centrally a perforation for permitting the bar to pass therethrough; and U-shaped spring means positioned between the contact means and the receptacle means, wherein the spring means is a leaf spring having a pair of spaced legs, and wherein the legs are positioned substantially perpendicularly relative to the longitudinal axis of the bar, and wherein the receptacle means is formed in one leg of the spring means.

* * * * *